May 26, 1970   M. VACANTE   3,513,839
VALVED NOSE FILTER
Filed Jan. 2, 1968

INVENTOR.
MATTHEW VACANTE
BY James P. Malone

United States Patent Office 3,513,839
Patented May 26, 1970

3,513,839
VALVED NOSE FILTER
Matthew Vacante, One Pasture Lane,
Old Bethpage, N.Y. 11804
Filed Jan. 2, 1968, Ser. No. 695,001
Int. Cl. A62b 23/06; A61m 15/08
U.S. Cl. 128—140                                    1 Claim

ABSTRACT OF THE DISCLOSURE

A hollow formed member adapted to be inserted in a nostril and filter material in said member. The member may be made with an exhaust by-pass controlled by a flipper check valve.

---

This invention relates to a filter adapted to be inserted in a nostril to filter the air being breathed.

Due to the air pollution in many situations and in industrial processes in commercial plants, it is desirable that individuals be provided with filters to filter out impurities in the air.

The present invention provides a soft, flexible, plastic member which is adapted to be inserted in the users nostrils, one in each nostril. The member has a passageway which contains filter material. The filter may comprise thin hair-like filaments. The member also preferably has a by-pass for exhaling which is normally closed at a flipper type check valve.

The filter member of the present invention may be made for permanent use so that it can be cleaned or they may be made for expendable use and discarded after a short time. The present filter can be used for prolonged periods without discomfort and can be worn while asleep without any discomfort.

The filter of the present invention may be useful in many cases other than to combat air pollution. They may be used to filter out pollen in the air for hay fever sufferers and they can also filter out dust particles in areas where there are high concentrations of dust or where there is a high concentration of pollen or particles resulting from chemical processes, spray painting or other commercial processes.

The present invention is also useful where it is desired to inhale medication for instance, nose drops may be placed in the filter so that the nose is continuously breathing in the medication.

Accordingly, a principal object of the invention is to provide new and improved nose filter means.

Another object of the invention is to provide new and improved filter means adapted to be inserted in the nostril where it will be fully seated and concealed from view.

Another object of the invention is to provide new and improved means for filtering polluted air and air containing pollen, dust particles, or other contaminates.

Another object of the invention is to provide new and improved means for administering medications by breathing through the nose.

Another object of the invention is to provide new and improved nostril filter comprising a formed hollow member adapted to be inserted in a nostril and filter material mounted in said hollow member.

These and other objects of the invention will be apparent by the following specifications and drawings of which:

Referring to the figures, the filter element 1 is adapted to be inserted in the nostril of the user. The element 1 is preferably made of a molded form substantially as shown which is adapted to fit the nostril cavity. It is preferably made of a soft plastic which is non allergenic such as polyethylene. In practice the members may be made in small, medium, and large sizes, and they would preferably be made soft enough and flexible enough so that they may fit in the nostril without discomfort and they are adapted to fit in the nostril cavity securely without any additional securing means. The members may be custom molded for particular individuals.

Figure 1:
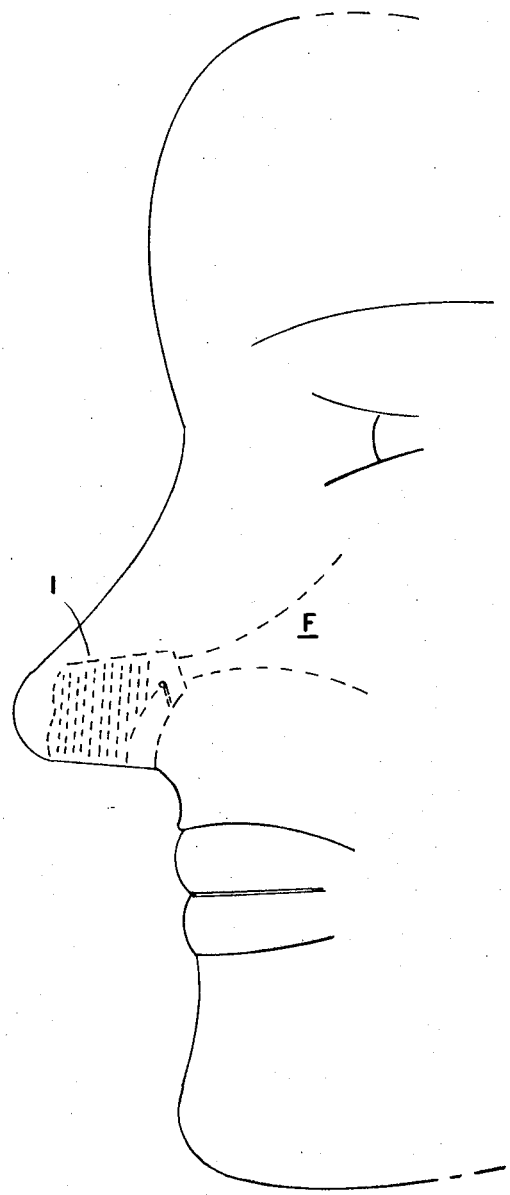
FIG. 1 is a diagrammatic drawing illustrating the use of the invention.
Figure 2:
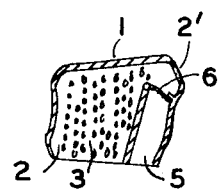
FIG. 2 is a side sectional view of an embodiment of the invention.
Figure 3:
FIG. 3 is a bottom view of the embodiment of FIG. 2.

Referring also to FIGS. 2 and 3, the member 1 has a first passageway 2 which runs from the bottom of the member to the upper right portion 2' and communicates with the nasal cavity indicated at F in FIG. 1. The passageway 2 contains filter material 3. The filter material may be of any suitable material which is adapted to permit inhaling without difficulty. In this embodiment as illustrated in FIG. 3 the filter may be hair-like filaments 4 which may be molded into the member 1 or otherwise affixed. The characteristics of the filter should be such that free inhaling is permitted and the material should therefore not be too closely packed but should be packed close enough to filter out the particles in the air such as dust particles and pollen. The filter material preferably has some absorption so that it may receive medication, such as nose drops of conventional type, so that the benefit of medication is obtained by inhaling. The member 1 preferably has another by-pass passage 5 at the top of which is mounted a flipper type check valve 6. This passage 5 facilitates exhaling so that when the user is exhaling it opens the valve 6 and passage 5 and permits free exhaling. The filter elements may be coated with a sticky substance to trap small particles.

Many modifications may be made by those who desire to practice the invention without departing from the scope thereof which is defined by the following claim.

I claim:

1. A nostril filter comprising a formed hollow tubular member adapted to be completely inserted in a nostril, said member being formed to fit the interior of a nostril, said member having first and second generally parallel passageways,
filter material in said first passageway, said second passageway by-passing said first passageway,
and a flipper check valve connected in said second passageway to permit second passageway to be used for exhaling only.

References Cited

UNITED STATES PATENTS

| 669,098 | 3/1901 | Overshiner | 128—198 |
| 958,569 | 5/1910 | Venner | 128—140 |
| 2,162,583 | 6/1939 | Kjellsson | 128—140 |
| 2,274,886 | 3/1942 | Carroll | 128—140 |
| 2,284,949 | 6/1942 | Cover | 128—140 |
| 2,335,936 | 12/1943 | Hanlon | 128—198 |
| 3,145,711 | 8/1964 | Beber | 128—140 |

FOREIGN PATENTS

| 28,036 | 7/1884 | Germany. |
| 645,645 | 11/1950 | Great Britain. |

RICHARD A. GAUDET, Primary Examiner

K. L. HOWELL, Assistant Examiner

U.S. Cl. X.R.

128—207